(12) United States Patent
Watabe et al.

(10) Patent No.: US 9,037,069 B2
(45) Date of Patent: May 19, 2015

(54) METHOD FOR PRODUCING CLEANING BLADE

(71) Applicant: CANON KABUSHIKI KAISHA, Tokyo (JP)

(72) Inventors: Masahiro Watabe, Yokohama (JP); Masaya Kawada, Yokohama (JP); Tomohiro Tanoue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/263,859

(22) Filed: Apr. 28, 2014

(65) Prior Publication Data

US 2014/0323667 A1 Oct. 30, 2014

(30) Foreign Application Priority Data

Apr. 30, 2013 (JP) .................................. 2013-096021
Apr. 11, 2014 (JP) .................................. 2014-082053

(51) Int. Cl.
*G03G 21/00* (2006.01)
*C08G 18/18* (2006.01)
*C08G 18/42* (2006.01)

(52) U.S. Cl.
CPC ........ *G03G 21/0017* (2013.01); *C08G 18/1825* (2013.01); *C08G 18/4238* (2013.01); *C08G 2105/02* (2013.01)

(58) Field of Classification Search
CPC ........... G03G 21/0011; G03G 21/0017; G08L 75/06; C08G 71/04; C08G 18/42
USPC ................... 525/453, 454; 528/367; 399/350; 430/119.82, 119.84
See application file for complete search history.

(56) References Cited

U.S. PATENT DOCUMENTS

| | | | |
|---|---|---|---|
| 5,168,309 A | 12/1992 | Adachi et al. | |
| 5,438,400 A | 8/1995 | Kuribayashi et al. | |
| 6,703,472 B2 * | 3/2004 | Miura et al. | ................... 528/57 |
| 2009/0003905 A1 | 1/2009 | Ueno et al. | |
| 2011/0052288 A1 | 3/2011 | Koido | |
| 2011/0236095 A1 | 9/2011 | Aoshima | |

FOREIGN PATENT DOCUMENTS

| | | |
|---|---|---|
| JP | 2001-075451 A | 3/2001 |
| JP | 3239607 B2 | 12/2001 |
| JP | 2008-009400 A | 1/2008 |
| JP | 2008-250311 A | 10/2008 |
| JP | 2008-268670 A | 11/2008 |
| JP | 2009-025451 A | 2/2009 |
| JP | 2012-150203 A | 8/2012 |
| WO | 2011/125824 A1 | 10/2011 |

* cited by examiner

*Primary Examiner* — Robert Jones, Jr.
(74) *Attorney, Agent, or Firm* — Canon U.S.A. Inc., IP Division

(57) ABSTRACT

In a method for producing a cleaning blade, a first composition obtained by causing a reaction of diphenylmethane diisocyanate and a first aliphatic polyester polyol which has a number-average molecular weight of 2000 to 3500 and is used in an amount of 20 to 40 mol % relative to the diphenylmethane diisocyanate and a second composition containing a urethane rubber-synthesizing catalyst and a second aliphatic polyester polyol which has a number-average molecular weight of 2000 to 3500 and is the same as or different from the first aliphatic polyester polyol are mixed so that a relationship between a number of moles ($M_{NCO}$ [mol]) of an NCO group in the first composition and a number of moles ($M_{OH}$ [mol]) of an OH group in the second composition satisfies $0.05 \leq M_{OH}/M_{NCO} \leq 0.20$.

10 Claims, No Drawings

METHOD FOR PRODUCING CLEANING BLADE

BACKGROUND OF THE INVENTION

1. Field of the Invention

The present invention relates to a method for producing a cleaning blade and specifically to a method for producing a cleaning blade for electrophotographic apparatuses.

2. Description of the Related Art

In general, even after a toner image formed on the surface (outer peripheral surface) of an electrophotographic photosensitive member (hereafter also simply referred to as "a photosensitive member") has been transferred onto a transfer material or an intermediate transfer member or even after the toner image has been further transferred onto a transfer material from the intermediate transfer member, part of toner easily remains on the surfaces of the photosensitive member and/or the intermediate transfer member. Therefore, the toner remaining on the surfaces of the photosensitive member and/or the intermediate transfer member needs to be removed. This removal is normally performed with a cleaning blade.

A cleaning blade is normally attached to a metal holder in an electrophotographic apparatus and used in a fixed state.

A cleaning blade is usually made of a urethane rubber having high wear resistance and a good property for permanent deformation.

An electrophotographic apparatus is often used in an environment of 5° C. to 40° C.

However, the elastic coefficient of urethane rubber tends to suddenly change near room temperature (10° C. to 25° C.) and thus urethane rubber is a material whose flexibility, strength, and the like required for cleaning are prone to be dependent on temperature. The temperature dependence is estimated using tan δ obtained from a dynamic viscoelasticity test and the peak temperature of tan δ. Many urethane rubbers have a peak temperature of tan δ near room temperature. Near the peak temperature of tan δ, the elasticity sharply increases and the flexibility tends to decrease. Thus, the peak temperature of tan δ can be as low as possible and tan δ can change in a gentle curve from a low temperature to a high temperature.

The hardness of the urethane rubber can be in the range of 65° to 85° in terms of cleaning performance. The higher the value of the hardness is, the harder the urethane rubber becomes.

Regarding the permanent deformation due to compression of urethane rubber, the contact pressure of an edge of the cleaning blade onto the surface of the photosensitive member or intermediate transfer member tends to decrease as the permanent deformation due to compression increases. Furthermore, it becomes difficult for an edge of the cleaning blade to uniformly come into contact with the surface of the photosensitive member or intermediate transfer member as the permanent deformation due to compression increases. Therefore, the permanent deformation due to compression can be as low as possible. In view of the wear resistance of urethane rubber, the permanent deformation due to compression can also be as low as possible.

Various urethane rubbers have been studied and, in particular, a method for improving the characteristics of a cleaning blade made of urethane rubber by adding an isocyanurate bond to the urethane rubber is being studied. The isocyanurate bond has a six-membered ring structure in which three isocyanates are trimerized. That is, the urethane rubber having an isocyanurate bond is a urethane rubber having a structure cross-linked with an isocyanurate bond. Therefore, the urethane rubber having an isocyanurate bond has high stiffness (low permanent deformation due to compression) and high thermal decomposition temperature (high resistance to thermal decomposition, high heat resistance) and thus is a good material for cleaning blades.

It is described in Japanese Patent Laid-Open No. 2008-250311 that a small amount of isocyanurating catalyst (isocyanate trimerization catalyst) is added to a urethane rubber raw material, a reaction is caused to synthesize a urethane rubber having an isocyanurate bond, and the urethane rubber is used for cleaning blades. It is also described that the use of the synthesized urethane rubber achieves high cleaning performance in a low-temperature environment and suppresses the chattering and curling in a high-temperature environment. It is also described that, in the urethane rubber, the ratio (IRCN(I)/IRCN(U)) of the infrared absorbance IRCN(I) of a C—N bond in an isocyanurate bond to the infrared absorbance IRCN(U) of a C—N bond in a urethane bond is 0.30 or more and 0.90 or less.

It is described in Japanese Patent Laid-Open No. 2008-9400 that a long-chain polyol having a number-average molecular weight of 1500 to 3800, an isocyanate, and an isocyanurate derivative having two or more OH groups are caused to react with each other to obtain a rubber-like elastic body (urethane rubber). It is also described that the obtained rubber-like elastic body is used for a cleaning blade to improve the wear resistance of the cleaning blade. It is also described that 0.5 to 15 parts of the isocyanurate derivative is contained relative to 100 parts of the long-chain polyol.

However, if a large amount of isocyanurate catalyst is used in the technology described in Japanese Patent Laid-Open No. 2008-250311, the rate of the synthesis reaction of the urethane rubber tends to increase. If the rate of the synthesis reaction of the urethane rubber excessively increases, gelation tends to occur on part of the isocyanurating catalyst. The gelation makes it difficult to obtain a cleaning blade uniformly made of urethane rubber. Therefore, a large amount of isocyanurating catalyst cannot be added and consequently it is difficult to increase the content of the isocyanurate bond in the urethane rubber.

The technology described in Japanese Patent Laid-Open No. 2008-9400 is a technology in which the isocyanurate derivative is added as a chain extender and a cross-linking agent. Use of a large amount of isocyanurate derivative easily causes the aggregation of the isocyanurate derivative, which poses a problem such as a difficulty in synthesizing the urethane rubber. Furthermore, use of the isocyanurate derivative in the synthesis of the urethane rubber increases the cost. Since the isocyanurate derivative has a high melting point, the temperature at which raw materials for synthesizing the urethane rubber are mixed needs to be increased (e.g., 140° C. or higher), which easily causes the gelation of the raw materials. Moreover, the molding temperature of a cleaning blade made of urethane rubber needs to be increased (e.g., 150° C. or higher), which tends to increase the production cost of cleaning blades.

SUMMARY OF THE INVENTION

The present invention provides a method for producing a cleaning blade made of urethane rubber which can be produced at low temperature and in which the content of an isocyanurate bond in the urethane rubber can be increased.

The present invention provides a method for producing a cleaning blade made of urethane rubber, the method including producing the urethane rubber through a step (i) below and a step (ii) below:

the step (i) is a step of obtaining a mixture of a first composition and a second composition by mixing the first composition and the second composition so that a relationship between a number of moles ($M_{NCO}$ [mol]) of an NCO group in the first composition and a number of moles ($M_{OH}$ [mol]) of an OH group in the second composition satisfies formula (a) below, $$0.05 \leq M_{OH}/M_{NCO} \leq 0.20 \tag{a}$$

where the first composition is obtained by causing a reaction of diphenylmethane diisocyanate and a first aliphatic polyester polyol which has a number-average molecular weight of 2000 to 3500 and is used in an amount of 20 to 40 mol % relative to the diphenylmethane diisocyanate, and the second composition contains a urethane rubber-synthesizing catalyst and a second aliphatic polyester polyol which has a number-average molecular weight of 2000 to 3500 and is the same as or different from the first aliphatic polyester polyol; and the step (ii) is a step of obtaining a urethane rubber having an isocyanurate bond by heating the mixture.

Further features of the present invention will become apparent from the following description of exemplary embodiments.

The present invention can provide a method for producing a cleaning blade made of urethane rubber which can be produced at low temperature and in which the content of an isocyanurate bond can be increased.

DESCRIPTION OF THE EMBODIMENTS

As described above, the present invention relates to a method for producing a cleaning blade made of urethane rubber. The method for producing a cleaning blade made of urethane rubber according to an embodiment of the present invention includes producing the urethane rubber through a step (i) below and a step (ii) below:

the step (i) is a step of obtaining a mixture of a first composition and a second composition by mixing the first composition and the second composition so that a relationship between a number of moles ($M_{NCO}$ [mol]) of an NCO group in the first composition and a number of moles ($M_{OH}$ [mol]) of an OH group in the second composition satisfies formula (a) below, $$0.05 \leq M_{OH}/M_{NCO} \leq 0.20 \tag{a}$$

where the first composition is obtained by causing a reaction of diphenylmethane diisocyanate and a first aliphatic polyester polyol which has a number-average molecular weight of 2000 to 3500 and is used in an amount of 20 to 40 mol % relative to the diphenylmethane diisocyanate, and the second composition contains a urethane rubber-synthesizing catalyst and a second aliphatic polyester polyol which has a number-average molecular weight of 2000 to 3500 and is the same as or different from the first aliphatic polyester polyol; and the step (ii) is a step of obtaining a urethane rubber having an isocyanurate bond by heating the mixture.

When the first composition is obtained, a first aliphatic polyester polyol which has a number-average molecular weight of 2000 to 3500 and is used in an amount of 20 to 35 mol % relative to the diphenylmethane diisocyanate can be used.

The urethane rubber of known cleaning blades is obtained by causing a reaction of a polyisocyanate, a polyol, a chain extender (bifunctional agent terminated with OH groups), and a cross-linking agent (trifunctional agent terminated with OH groups) and mainly includes a urethane bond and an allophanate bond.

As described above, the technology described in Japanese Patent Laid-Open No. 2008-250311 is a technology in which an isocyanurating catalyst (isocyanate trimerization catalyst) is added to a known method for synthesizing a urethane rubber. The obtained urethane rubber (hereafter also referred to as "a urethane rubber according to Japanese Patent Laid-Open No. 2008-250311") mainly includes a urethane bond, an allophanate bond, and an isocyanurate bond.

The technology described in Japanese Patent Laid-Open No. 2008-9400 is a technology in which an isocyanurate derivative is added as a cross-linking agent to a known method for synthesizing a urethane rubber. The obtained urethane rubber (hereafter also referred to as "a urethane rubber according to Japanese Patent Laid-Open No. 2008-9400") mainly includes a urethane bond, an allophanate bond, and an isocyanurate bond derived from the isocyanurate derivative.

A urethane rubber of a cleaning blade produced by the production method according to an embodiment of the present invention (hereafter also referred to as "a urethane rubber according to an embodiment of the present invention") mainly includes a urethane bond and an isocyanurate bond.

The content of an isocyanurate bond in the urethane rubber according to an embodiment of the present invention is higher than that in the urethane rubber according to Japanese Patent Laid-Open No. 2008-250311.

The isocyanurate bond contained in the urethane rubber according to an embodiment of the present invention is different from the isocyanurate bond contained in the urethane rubber according to Japanese Patent Laid-Open No. 2008-9400, and is an isocyanurate bond derived from diphenylmethane diisocyanate. That is, in the present invention, the diphenylmethane diisocyanate serves as an isocyanurate bond. Therefore, an isocyanurate derivative is not necessarily used as a urethane rubber raw material. As a result, a urethane rubber having an isocyanurate bond can be obtained at a relatively low cost.

A urethane rubber having many isocyanurate bonds has a structure cross-linked with the isocyanurate bonds and thus has high heat resistance and low permanent deformation due to compression. Therefore, a cleaning blade made of the urethane rubber has both high durability and good cleaning performance.

The first feature of the present invention is to obtain a mixture of a first composition and a second composition by mixing the first composition and the second composition so that a relationship between the number of moles ($M_{NCO}$ [mol]) of an NCO group in the first composition and the number of moles ($M_{OH}$ [mol]) of an OH group in the second composition satisfies formula (a) below, $$0.05 \leq M_{OH}/M_{NCO} \leq 0.20 \tag{a}$$

where the first composition is obtained by causing a reaction of diphenylmethane diisocyanate and an aliphatic polyester polyol and the second composition contains a urethane rubber-synthesizing catalyst and an aliphatic polyester polyol terminated with hydroxy groups (OH groups). In particular, the first composition and the second composition can be mixed with each other so that the relationship between the number of moles ($M_{NCO}$ [mol]) of an NCO group in the first composition and the number of moles $M_{OH}$ [mol]) of an OH group in the second composition satisfies formula (b) below.

$$0.08 \leq M_{OH}/M_{NCO} \leq 0.15 \tag{b}$$

This means that the first composition and the second composition are mixed with each other so that the NCO group in the first composition is contained in an appropriately excessive amount relative to the OH group in the second composition. The diphenylmethane diisocyanate is a molecule terminated with isocyanate groups (NCO groups) and the aliphatic polyester polyol is a molecule terminated with hydroxy groups (OH groups).

The second feature of the present invention is that the aliphatic polyester polyol in the first composition and the aliphatic polyester polyol in the second composition each have a number-average molecular weight of 2000 to 3500.

The aliphatic polyester polyol in the first composition and the aliphatic polyester polyol in the second composition may be the same or different from each other. For convenience of description, the aliphatic polyester polyol in the first composition is also referred to as "a first aliphatic polyester polyol" and the aliphatic polyester polyol in the second composition is also referred to as "a second aliphatic polyester polyol".

With these features, the temperature during the production can be decreased and the content of an isocyanurate bond in the urethane rubber can be increased.

The peak temperature of tan δ of the urethane rubber contained in the cleaning blade can be as low as possible and specifically can be 5° C. or lower. Furthermore, tan δ of the urethane rubber contained in the cleaning blade can change in a gentle curve from a low temperature to a high temperature. Specifically, tan δ can be 0.7 or less at 5° C. and 0.1 or more at 40° C. A decrease in the peak temperature of tan δ of the urethane rubber contained in the cleaning blade suppresses the decrease in the elasticity of the cleaning blade in a low-temperature environment. A gentler curve of tan δ from a low temperature to a high temperature suppresses the decrease in the elasticity of the cleaning blade in a low-temperature environment. When the decrease in the elasticity of the cleaning blade in a low-temperature environment is suppressed, the degradation of the cleaning performance in a low-temperature environment can be suppressed. A decrease in the peak temperature of tan δ of the urethane rubber contained in the cleaning blade suppresses the decrease in viscosity. A gentler curve of tan δ from a low temperature to a high temperature suppresses the decrease in viscosity. When the decrease in viscosity is suppressed, the chattering and curling of the cleaning blade in a high-temperature environment can be suppressed. In the present invention, tan δ of the urethane rubber is measured with a dynamic viscoelasticity measurement instrument (trade name: Exstra 6100 DMS) manufactured by Seiko Instruments Inc.

The hardness of the urethane rubber contained in the cleaning blade can be in the range of 65° to 85°.

The content of an isocyanurate bond in the urethane rubber can be measured with a Fourier transform infrared spectrometer (FTIR). Specifically, the measurement of an infrared absorption spectrum (hereafter also referred to as "an IR absorption spectrum") is performed on the urethane rubber contained in the cleaning blade. By determining the ratio (IRCN(I)/IRCN(U)) of the infrared absorbance (hereafter also referred to as "IRCN(I)") of a C—N bond in an isocyanurate bond to the infrared absorbance (hereafter also referred to as "IRCN(U)") of a C—N bond in a urethane bond in the urethane rubber, the content of an isocyanurate bond in the urethane rubber can be determined. As the ratio IRCN(I)/IRCN(U) in the urethane rubber increases, the content of an isocyanurate bond in the urethane rubber increases. In the IR absorption spectrum, ν (C—N) of an isocyanurate bond in the urethane rubber appears near 1412 $cm^{-1}$ and ν (C—N) of a urethane bond in the urethane rubber appears near 1530 $cm^{-1}$.

The content of an isocyanurate bond in the urethane rubber contained in the cleaning blade can be high to some extent, and the ratio IRCN(I)/IRCN(U) in the urethane rubber can be in the range of 2.0 to 3.5. In the production method according to an embodiment of the present invention, a cleaning blade made of a urethane rubber having a ratio IRCN(I)/IRCN(U) of 2.0 to 3.5 can be easily produced. The range of 2.0 to 3.5 of the ratio IRCN(I)/IRCN(U) is larger than the range of 0.49 to 0.86 described in Japanese Patent Laid-Open No. 2008-250311, which means that the content of an isocyanurate bond in the urethane rubber is higher than before. As the ratio IRCN(I)/IRCN(U) in the urethane rubber increases, the permanent deformation due to compression of the cleaning blade made of the urethane rubber tends to decrease. However, an increase in the ratio IRCN(I)/IRCN(U) in the urethane rubber tends to increase the peak temperature of tan δ of the cleaning blade made of the urethane rubber. Therefore, the ratio IRCN(I)/IRCN(U) in the urethane rubber contained in the cleaning blade can be in the range of 2.0 to 3.5.

The method for producing a cleaning blade according to an embodiment of the present invention will now be more specifically described.

The first step in the method for producing a cleaning blade according to an embodiment of the present invention is a step of obtaining a mixture of the first composition and the second composition by mixing the first composition and the second composition so that the formula (a) below is satisfied.

$$0.05 \leq M_{OH}/M_{NCO} \leq 0.20 \tag{a}$$

When the first composition and the second composition are mixed with each other, the first composition and second composition that have been heated to 60° C. to 80° C. in advance can be mixed with each other while being stirred.

A decrease in $M_{OH}/M_{NCO}$ ($M_{NCO}$ increases relative to $M_{OH}$) in the formula (a) tends to increase the content of an isocyanurate bond in the obtained urethane rubber. The increase in the content of an isocyanurate bond in the urethane rubber tends to increase the peak temperature of tan δ of the urethane rubber and also tends to increase the hardness of the urethane rubber.

An increase in $M_{OH}/M_{NCO}$ ($M_{NCO}$ approaches $M_{OH}$ or $M_{NCO}$ decreases relative to $M_{OH}$) in the formula (a) tends to decrease the content of an isocyanurate bond in the obtained urethane rubber. The decrease in the content of an isocyanurate bond in the urethane rubber tends to decrease the hardness of the urethane rubber, tends to decrease the amount of a cross-linked structure in the urethane rubber, and also tends to increase the permanent deformation due to compression of the urethane rubber.

The second step in the method for producing a cleaning blade according to an embodiment of the present invention is a step of obtaining a urethane rubber having an isocyanurate bond by heating the mixture.

Examples of the method for heating the mixture include a method in which the mixture is poured into a mold heated to a predetermined temperature and, after a predetermined time period, a urethane rubber is taken out of the mold and a method in which the mixture is continuously caused to pass through a cylindrical mold heated to a predetermined temperature and, after a predetermined time period, a urethane rubber is continuously taken out.

The temperature of the mold is preferably 90° C. to 140° C. and more preferably 100° C. to 130° C. As the temperature of the mold increases, the rate of the synthesis reaction of the urethane rubber increases and consequently the formation of an isocyanurate bond tends to be facilitated. As the temperature of the mold decreases, the decomposition of a formed urethane bond is suppressed and consequently the degradation of the urethane rubber is suppressed.

The polyisocyanate used when the first composition is obtained is diphenylmethane diisocyanate. An example of the diphenylmethane diisocyanate is 4,4'-diphenylmethane diisocyanate (MDI).

In the present invention, the diphenylmethane diisocyanate and a polyisocyanate other than the diphenylmethane diisocyanate may be used together. Examples of the polyisocyanate other than the diphenylmethane diisocyanate include 2,4-tolylene diisocyanate (2,4-TDI), 2,6-tolylene diisocyanate (2,6-TDI), xylene diisocyanate (XDI), 1,5-naphthylene diisocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylene diisocyanate (TMXDI), carbodiimide-modified MDI, and polymethylenephenyl polyisocyanate (PAPI).

An example of the first aliphatic polyester polyol used in the first composition is an aliphatic polyester polyol represented by formula (1) below.

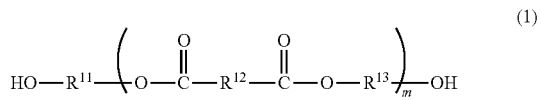

In the formula (1), $R^{11}$ to $R^{13}$ each independently represent an alkylene group having 2 to 8 carbon atoms; m represents a number of repetitions of a structure in parentheses; and when m is 2 or more, $R^{12}$ in the parentheses may be the same or different and $R^{13}$ in the parentheses may be the same or different.

Examples of the alkylene group having 2 to 8 carbon atoms include an ethylene group, a propylene group, a butylene group, a pentylene group, a hexylene group, a heptylene group, and an octylene group.

Among the aliphatic polyester polyols, ethylene butylene adipate polyester polyol, butylene adipate polyester polyol, hexylene adipate polyester polyol, and lactone polyester polyol can be used. These aliphatic polyester polyols may be used as a mixture. Among these aliphatic polyester polyols, butylene adipate polyester polyol and hexylene adipate polyester polyol can be particularly used in terms of high crystallinity. As the crystallinity of the aliphatic polyester polyol increases, the hardness and the tensile stress at 100% elongation of the obtained urethane rubber (cleaning blade made of urethane rubber) increase. As a result, the durability of the cleaning blade can be improved.

The number-average molecular weight of the first aliphatic polyester polyol used in the first composition is 2000 to 3500 and preferably 2000 to 3000. As the number-average molecular weight of the aliphatic polyester polyol increases, the hardness, elastic coefficient, and tensile strength of the obtained urethane rubber (cleaning blade made of urethane rubber) increase. As the number-average molecular weight decreases, the viscosity decreases, which provides ease of handling.

An example of the second aliphatic polyester polyol used in the second composition is an aliphatic polyester polyol represented by formula (2) below.

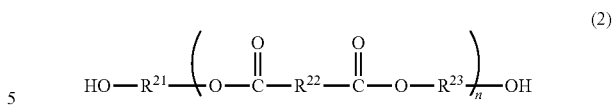

In the formula (2), $R^{21}$ to $R^{23}$ each independently represent an alkylene group having 2 to 8 carbon atoms; n represents a number of repetitions of a structure in parentheses; and when n is 2 or more, $R^{22}$ in the parentheses may be the same or different and $R^{23}$ in the parentheses may be the same or different.

Examples of the alkylene group having 2 to 8 carbon atoms include an ethylene group, a propylene group, a butylene group, a pentylene group, a hexylene group, a heptylene group, and an octylene group.

Among the aliphatic polyester polyols, ethylene butylene adipate polyester polyol, butylene adipate polyester polyol, hexylene adipate polyester polyol, and lactone polyester polyol can be used. These aliphatic polyester polyols may be used as a mixture. Among these aliphatic polyester polyols, butylene adipate polyester polyol and hexylene adipate polyester polyol can be particularly used in terms of high crystallinity. As the crystallinity of the aliphatic polyester polyol increases, the hardness and the tensile stress at 100% elongation of the obtained urethane rubber (cleaning blade made of urethane rubber) increase. As a result, the durability of the cleaning blade can be improved.

The number-average molecular weight of the second aliphatic polyester polyol used in the second composition is 2000 to 3500 and preferably 2000 to 3000. As the number-average molecular weight of the aliphatic polyester polyol increases, the hardness, elastic coefficient, and tensile strength of the obtained urethane rubber (cleaning blade made of urethane rubber) increase. As the number-average molecular weight decreases, the viscosity decreases, which provides ease of handling.

The first aliphatic polyester polyol and the second aliphatic polyester polyol may be the same or different from each other.

The number-average molecular weight of the total of the first aliphatic polyester polyol and the second aliphatic polyester polyol is preferably 2000 to 3500 and more preferably 2000 to 3000. As the number-average molecular weight of the total of the aliphatic polyester polyols increases, the hardness, elastic coefficient, and tensile strength of the obtained urethane rubber (cleaning blade made of urethane rubber) increase. As the number-average molecular weight decreases, the viscosity of the mixture of the first composition and the second composition decreases, which provides ease of handling.

The urethane rubber-synthesizing catalyst used in the second composition is broadly classified into a urethanization catalyst (reaction-promoting catalyst) for promoting rubber formation (resinification) and foaming and an isocyanurating catalyst (isocyanate trimerization catalyst).

Examples of the urethanization catalyst include tin-based urethanization catalysts such as dibutyltin dilaurate and stannous octoate and amine-based urethanization catalysts such as triethylenediamine, tetramethylguanidine, pentamethyldiethylenetriamine, dimethylimidazole, tetramethylpropanediamine, and N,N,N'-trimethylaminoethylethanolamine. In the present invention, these urethanization catalysts may be used as a mixture.

Examples of the isocyanurating catalyst include metal oxides such as $Li_2O$ and $(Bu_3Sn)_2O$; hydride compounds such as $NaBH_4$; alkoxide compounds such as $NaOCH_3$, KO- (t-Bu), and borates; amine compounds such as $N(C_2H_5)_3$, $N(CH_3)_2CH_2C_2H_5$, and $N_2C_6H_{12}$; alkaline carboxylate compounds such as $HCO_2Na$, $CO_3Na_2$, $PhCO_2Na/DMF$, $CH_3CO_2K$, $(CH_3CO)_2Ca$, alkaline soaps, and naphthenic acid; alkaline formate compounds; and quaternary ammonium salt compounds such as $((R^1)_3—NR^2OH)—OOCR^3$. Examples of a combined catalyst include amine/epoxide, amine/carboxylic acid, and amine/alkylene imide. In the present invention, these catalysts may be used as a mixture.

Among the urethane rubber-synthesizing catalysts, N,N,N'-trimethylaminoethylethanolamine can be particularly used because N,N,N'-trimethylaminoethylethanolamine alone exhibits an effect of a urethanization catalyst and also an effect of an isocyanurating catalyst when used in the production method according to an embodiment of the present invention.

The content of the urethane rubber-synthesizing catalyst in the second composition can be 0.01% to 0.5% by mass relative to the total mass of the second composition.

The hardness of the urethane rubber contained in the cleaning blade (cleaning blade made of urethane rubber) can be 65° to 85° (international rubber hardness degrees (IRHD)). As the hardness of the urethane rubber contained in the cleaning blade (cleaning blade made of urethane rubber) increases, higher contact pressure can be achieved when the cleaning blade is brought into contact with a photosensitive member or an intermediate transfer member. As the hardness of the urethane rubber contained in the cleaning blade (cleaning blade made of urethane rubber) decreases, formation of scratches on the surface of a photosensitive member or an intermediate transfer member tends to be suppressed. In the present invention, the hardness of the urethane rubber (cleaning blade made of urethane rubber) is measured by an M method of the international rubber hardness test defined in JIS K 6253-1997.

The tensile stress at 100% elongation (100% modulus) of the cleaning blade can be 2.5 to 6.0 MPa. As the tensile stress at 100% elongation of the cleaning blade increases, higher contact pressure can be achieved when the cleaning blade is brought into contact with a photosensitive member or an intermediate transfer member. As the tensile stress at 100% elongation of the cleaning blade decreases, the curling of the cleaning blade tends to be suppressed.

The maximum elongation of the cleaning blade can be 250% or less. As the maximum elongation of the cleaning blade decreases, the formation of large defects (e.g., 10 μm or more) tends to be suppressed. When the formation of such large defects is suppressed, the cleaning blade can be suitably used to remove toner particles having a small particle size (e.g., 10 μm or less).

The permanent deformation due to compression of the urethane rubber contained in the cleaning blade can be 5% or less. As the permanent deformation due to compression decreases, the decrease in contact pressure can be suppressed even if the cleaning blade remains in contact with the surface of a photosensitive member or an intermediate transfer member for a long time.

In the production method according to an embodiment of the present invention, a cleaning blade made of urethane rubber can be produced so as to have the above-described appropriate hardness, tensile stress at 100% elongation (100% modulus), maximum elongation, and permanent deformation due to compression.

The first composition and the second composition may optionally contain additives such as a pigment, a plasticizer, a waterproofing agent, an antioxidant, an ultraviolet absorber, and a photostabilizer.

EXAMPLES

Hereinafter, the present invention will be described based on Examples. In Examples, "part" means "part by mass".

Calculation Method of $M_{OH}/M_{NCO}$ (1) Calculation Method of $M_{NCO}$ (I) Case where One Type of First Aliphatic Polyester Polyol is Used Molecular weight of diphenylmethane diisocyanate: 250.25

Purity of diphenylmethane diisocyanate used: 99.8 [mass%]

Mass of diphenylmethane diisocyanate used: A [g]

Number-average molecular weight of first aliphatic polyester polyol (1): B

Mass of first aliphatic polyester polyol (1) used: C [g]

Number of moles of diphenylmethane diisocyanate: $F=(A\times0.998)/250.25$

Number of moles of first aliphatic polyester polyol: $G=C/B$

Number of moles of first aliphatic polyester polyol per one mole of diphenylmethane diisocyanate: $H=G/F$ $$M_{NCO}=2\times1-2\times H=2-2\times(C/B)/\{(A\times0.998)/250.25\}$$

(II) Case where Two Types of First Aliphatic Polyester Polyols are Used

Molecular weight of diphenylmethane diisocyanate: 250.25

Purity of diphenylmethane diisocyanate used: 99.8 [mass%]

Mass of diphenylmethane diisocyanate used: A [g]

Number-average molecular weight of first aliphatic polyester polyol (1): B

Mass of first aliphatic polyester polyol (1) used: C [g]

Number-average molecular weight of first aliphatic polyester polyol (2): D

Mass of first aliphatic polyester polyol (2) used: E [g]

Number of moles of diphenylmethane diisocyanate: $F=(A\times0.998)/250.25$

Total number of moles of first aliphatic polyester polyols: $G=(C/B)+(E/D)$

Total number of moles of first aliphatic polyester polyols per one mole of diphenylmethane diisocyanate: $H=G/F$ $$M_{NCO}=2\times1-2\times H=2-2\times\{(C/B)+(E/D)\}/\{(A\times0.998)/250.25\}$$

(2) Calculation Method of $M_{OH}$

Number-average molecular weight of second aliphatic polyester polyol (3): P

Mass of second aliphatic polyester polyol (3) used: Q [g]

$M_{OH}$=Total number of moles of second aliphatic polyester polyol: $O=Q/P$ (3) Calculation Method of $M_{OH}/M_{NCO}$ $$M_{OH}/M_{NCO}=O/2\times1-2\times H=(Q/P)/[2-2\times\{(C/B)+(E/D)\}/\{(A\times0.998)/250.25\}]$$

Method for Measuring Number-Average Molecular Weight

The number-average molecular weight was measured by gel permeation chromatography (GPC). That is, monodisperse polystyrenes for GPC were used, a calibration curve was prepared from the peak count and the number-average molecular weight of the monodisperse polystyrenes, and the calculation was conducted by a typical method. Specifically, in the present invention, the number-average molecular weight of the aliphatic polyester polyol is obtained by dissolving the aliphatic polyester polyol in tetrahydrofuran (solvent) and measuring the number-average molecular weight of the dissolved component using the following instruments and the like under the following conditions.

GPC instrument: HLC-8120GPC (trade name) manufactured by TOSOH CORPORATION

Column: TSK-GEL (trade name), G-5000HXL (trade name), G-4000HXL (trade name), G-3000HXL (trade name), and G-2000HXL (trade name) manufactured by TOSOH CORPORATION Detector: differential refractometer Solvent: tetrahydrofuran Solvent concentration: 0.5 mass %

Flow rate: 1.0 ml/min

Method for Measuring IRCN(I)/IRCN(U)

In the present invention, the IRCN(I)/IRCN(U) of the urethane rubber contained in the cleaning blade was obtained by measuring the IR absorption spectrum of the urethane rubber using a Fourier transform infrared spectrometer. The Fourier transform infrared spectrometer used was PerkinElmer Spectrum One/Spotlight 300 (trade name) manufactured by PerkinElmer Co., Ltd. Specifically, the ratio (IRCN(I)/IRCN(U)) of the infrared absorbance IRCN(I) of a C—N bond in an isocyanurate bond to the infrared absorbance IRCN(U) of a C—N bond in a urethane bond in the urethane rubber was determined from (1) the infrared absorbance IRCN(I) of ν (C—N) of an isocyanurate bond near 1412 cm$^{-1}$ of the IR absorption spectrum and (2) the infrared absorbance IRCN (U) of ν (C—N) of a urethane bond near 1530 cm$^{-1}$ of the IR absorption spectrum.

Method for Measuring Hardness and Tensile Strength

After the cleaning blade made of urethane rubber was subjected to aging, the hardness and the tensile properties were measured. Specifically, aging was completed three hours after the mold release (after the cleaning blade was produced). Subsequently, the cleaning blade was left to stand at room temperature for six hours and then the hardness and tensile strength of the cleaning blade were measured.

In the present invention, the hardness (IRHD) of the cleaning blade made of urethane rubber was measured by an M method of the international rubber hardness test using a Wallace microhardness meter manufactured by H. W. WALLACE. The M method of the international rubber hardness test is defined in JIS K 6253-1997.

The cleaning blade was stamped to prepare a JIS #3 dumbbell. A tensile test was performed at a crosshead speed of 500 mm/min to measure the tensile stress at 100% elongation (100% modulus).

The maximum elongation of the cleaning blade was measured to calculate the maximum elongation percentage.

Method for Measuring Tan δ

In the present invention, tan δ of the cleaning blade made of urethane rubber was measured at a frequency of 10 Hz in a temperature range of −50° C. to +130° C. using a dynamic viscoelasticity measurement instrument (trade name: Exstra 6100 DMS) manufactured by Seiko Instruments Inc.

Method for Measuring Permanent Deformation Due to Compression

The permanent deformation due to compression of the cleaning blade made of urethane rubber was measured in conformity with JIS K 6262-1997.

Example 1

Step of Obtaining First Composition

A first composition containing 7.0 mass % of an NCO group was prepared by causing 280 parts of 4,4'-diphenylmethane diisocyanate and 720 parts of butylene adipate polyester polyol having a number-average molecular weight of 2600 to react with each other at 80° C. for three hours. Hereafter, the butylene adipate polyester polyol having a number-average molecular weight of 2600 is also referred to as "BA2600".

Step of Obtaining Second Composition

A second composition was prepared by adding 0.25 parts of N,N,N'-trimethylaminoethylethanolamine serving as a urethane rubber-synthesizing catalyst to 250 parts of hexylene adipate polyester polyol having a number-average molecular weight of 2000 and performing stirring at 60° C. for one hour. Hereafter, the hexylene adipate polyester polyol having a number-average molecular weight of 2000 is also referred to as "HA2000". The N,N,N'-trimethylaminoethylethanolamine is also referred to as "ETA".

Step of Obtaining Mixture

The first composition was heated to 80° C. and the second composition heated to 60° C. was added to the first composition. Stirring was then performed to obtain a mixture of the first composition and the second composition. The ratio $M_{OH}/M_{NCO}$ was 0.15.

Step of Producing Cleaning Blade Made of Urethane Rubber

The mixture was poured into a cavity of a mold for producing a cleaning blade, the mold having been heated to 110° C. in advance. Subsequently, the mixture was subjected to a curing reaction by performing heating at 110° C. for 30 minutes and then released from the mold to produce a cleaning blade made of urethane rubber.

The above-described analysis, measurement, and physical property evaluation were performed on the produced cleaning blade made of urethane rubber. The ratio $M_{OH}/M_{NCO}$ was calculated by the above-described method. Tables 1 to 3 show the results and the like.

Example 2

A cleaning blade made of urethane rubber was produced in the same manner as in Example 1, except that the amount of the hexylene adipate polyester polyol having a number-average molecular weight of 2000 and used in the step of obtaining the second composition was changed from 250 parts to 200 parts. The analysis, measurement, and physical property evaluation were performed. Tables 1 to 3 show the results and the like.

In the step of obtaining a mixture, the ratio $M_{OH}/M_{NCO}$ was 0.12.

Example 3

A cleaning blade was produced in the same manner as in Example 1, except that the amount of the hexylene adipate polyester polyol having a number-average molecular weight of 2000 and used in the step of obtaining the second composition was changed from 250 parts to 150 parts. The analysis, measurement, and physical property evaluation were performed. Tables 1 to 3 show the results and the like.

In the step of obtaining a mixture, the ratio $M_{OH}/M_{NCO}$ was 0.09.

Example 4

Step of Obtaining First Composition

A first composition containing 7.0 mass % of an NCO group was prepared by causing 302 parts of 4,4'-diphenylmethane diisocyanate, 349.3 parts of butylene adipate polyester polyol having a number-average molecular weight of 2000, and 349.3 parts of hexylene adipate polyester polyol having a number-average molecular weight of 2000 to react with each other at 80° C. for three hours. Hereafter, the butylene adipate polyester polyol having a number-average molecular weight of 2000 is also referred to as "BA2000".

Step of Obtaining Second Composition

A second composition was prepared by adding 0.25 parts of N,N,N'-trimethylaminoethylethanolamine serving as a urethane rubber-synthesizing catalyst to 250 parts of butylene adipate polyester polyol having a number-average molecular weight of 2000 and performing stirring at 60° C. for one hour.

Step of Obtaining Mixture

The first composition was heated to 80° C. and the second composition heated to 60° C. was added to the first composition. Stirring was then performed to obtain a mixture of the first composition and the second composition. The ratio $M_{OH}/M_{NCO}$ was 0.15.

Step of Producing Cleaning Blade Made of Urethane Rubber

The mixture was poured into a cavity of a mold for producing a cleaning blade, the mold having been heated to 110° C. in advance. Subsequently, the mixture was subjected to a curing reaction by performing heating at 110° C. for 30 minutes and then released from the mold to produce a cleaning blade made of urethane rubber.

The above-described analysis, measurement, and physical property evaluation were performed on the produced cleaning blade made of urethane rubber. Values used to calculate the ratio $M_{OH}/M_{NCO}$ were calculated by the above-described method. Tables 1 to 3 show the results and the like.

Example 5

A cleaning blade was produced in the same manner as in Example 4, except that the amount of the butylene adipate polyester polyol having a number-average molecular weight of 2000 and used in the step of obtaining the second composition was changed from 250 parts to 200 parts. The analysis, measurement, and physical property evaluation were performed. Tables 1 to 3 show the results and the like.

In the step of obtaining a mixture, the ratio $M_{OH}/M_{NCO}$ was 0.12.

Example 6

A cleaning blade was produced in the same manner as in Example 4, except that 250 parts of the butylene adipate polyester polyol having a number-average molecular weight of 2000 and used in the step of obtaining the second composition was changed to 200 parts of hexylene adipate polyester polyol having a number-average molecular weight of 2500. The analysis, measurement, and physical property evaluation were performed. Tables 1 to 3 show the results and the like. Hereafter, the hexylene adipate polyester polyol having a number-average molecular weight of 2500 is also referred to as "HA2500".

In the step of obtaining a mixture, the ratio $M_{OH}/M_{NCO}$ was 0.15.

Example 7

A cleaning blade was produced in the same manner as in Example 4, except that 250 parts of the butylene adipate polyester polyol having a number-average molecular weight of 2000 and used in the step of obtaining the second composition was changed to 200 parts of hexylene adipate polyester polyol having a number-average molecular weight of 2000. The analysis, measurement, and physical property evaluation were performed. Tables 1 to 3 show the results and the like.

In the step of obtaining a mixture, the ratio $M_{OH}/M_{NCO}$ was 0.12.

Example 8

A cleaning blade was produced in the same manner as in Example 4, except that 250 parts of the butylene adipate polyester polyol having a number-average molecular weight of 2000 and used in the step of obtaining the second composition was changed to 300 parts of hexylene adipate polyester polyol having a number-average molecular weight of 2500. The analysis, measurement, and physical property evaluation were performed. Tables 1 to 3 show the results and the like.

In the step of obtaining a mixture, the ratio $M_{OH}/M_{NCO}$ was 0.18.

Example 9

A cleaning blade was produced in the same manner as in Example 4, except that 250 parts of the butylene adipate polyester polyol having a number-average molecular weight of 2000 and used in the step of obtaining the second composition was changed to 300 parts of hexylene adipate polyester polyol having a number-average molecular weight of 2000. The analysis, measurement, and physical property evaluation were performed. Tables 1 to 3 show the results and the like.

In the step of obtaining a mixture, the ratio $M_{OH}/M_{NCO}$ was 0.18.

Comparative Example 1

A cleaning blade was produced in the same manner as in Example 1, except that the amount of the hexylene adipate polyester polyol having a number-average molecular weight of 2000 and used in the step of obtaining the second composition was changed from 250 parts to 400 parts. The analysis, measurement, and physical property evaluation were performed. Tables 1 to 3 show the results and the like.

In the step of obtaining a mixture, the ratio $M_{OH}/M_{NCO}$ was 0.24.

Comparative Example 2

A cleaning blade was produced in the same manner as in Example 1, except that the amount of the hexylene adipate polyester polyol having a number-average molecular weight of 2000 and used in the step of obtaining the second composition was changed from 250 parts to 50 parts. The analysis, measurement, and physical property evaluation were performed. Tables 1 to 3 show the results and the like.

In the step of obtaining a mixture, the ratio $M_{OH}/M_{NCO}$ was 0.03.

Comparative Example 3

A cleaning blade was produced in the same manner as in Example 1, except that 250 parts of the hexylene adipate polyester polyol having a number-average molecular weight of 2000 and used in the step of obtaining the second composition was changed to 80 parts of hexylene adipate polyester polyol having a number-average molecular weight of 1000. The analysis, measurement, and physical property evaluation were performed. Tables 1 to 3 show the results and the like. Hereafter, the hexylene adipate polyester polyol having a number-average molecular weight of 1000 is also referred to as "HA1000".

In the step of obtaining a mixture, the ratio $M_{OH}/M_{NCO}$ was 0.30.

TABLE 1

| | First composition | | | | Second composition | | | |
|---|---|---|---|---|---|---|---|---|
| | Diisocyanate | Aliphatic polyester polyol (1), (2) | | | Aliphatic polyester polyol (3) | | | |
| | MDI [part] | BA2600 [part] | BA2000 [part] | HA2000 [part] | BA2000 [part] | HA2500 [part] | HA2000 [part] | HA1000 [part] |
| Ex. 1 | 280 | 720 | — | — | — | — | 250 | — |
| Ex. 2 | 280 | 720 | — | — | — | — | 200 | — |
| Ex. 3 | 280 | 720 | — | — | — | — | 150 | — |
| Ex. 4 | 302 | — | 349.3 | 349.3 | 250 | — | — | — |
| Ex. 5 | 302 | — | 349.3 | 349.3 | 200 | — | — | — |
| Ex. 6 | 302 | — | 349.3 | 349.3 | — | 250 | — | — |
| Ex. 7 | 302 | — | 349.3 | 349.3 | — | — | 200 | — |
| Ex. 8 | 302 | — | 349.3 | 349.3 | — | 300 | — | — |
| Ex. 9 | 302 | — | 349.3 | 349.3 | — | — | 300 | — |
| C.E. 1 | 280 | 720 | — | — | — | — | 400 | — |
| C.E. 2 | 280 | 720 | — | — | — | — | 50 | — |
| C.E. 3 | 280 | 720 | — | — | — | — | — | 250 |

Ex.: Example,
C.E.: Comparative Example

TABLE 2

Calculation of $M_{OH}/M_{NCO}$ in step of obtaining mixture

| | First composition | | Second composition | |
|---|---|---|---|---|
| | Diisocyanate MDI | Aliphatic polyester polyol H = G/F | Aliphatic polyester polyol O = Q/P | $M_{OH}/M_{NCO}$ |
| Ex. 1 | 1.00 | 0.25 | 0.11 | 0.15 |
| Ex. 2 | 1.00 | 0.25 | 0.09 | 0.12 |
| Ex. 3 | 1.00 | 0.25 | 0.07 | 0.09 |
| Ex. 4 | 1.00 | 0.29 | 0.10 | 0.15 |
| Ex. 5 | 1.00 | 0.29 | 0.08 | 0.12 |
| Ex. 6 | 1.00 | 0.29 | 0.10 | 0.15 |
| Ex. 7 | 1.00 | 0.29 | 0.08 | 0.12 |
| Ex. 8 | 1.00 | 0.29 | 0.12 | 0.18 |
| Ex. 9 | 1.00 | 0.29 | 0.12 | 0.18 |
| C.E. 1 | 1.00 | 0.25 | 0.18 | 0.24 |
| C.E. 2 | 1.00 | 0.25 | 0.02 | 0.03 |
| C.E. 3 | 1.00 | 0.25 | 0.22 | 0.30 |

Ex.: Example,
C.E.: Comparative Example

TABLE 3

| | Hardness (IRHD) [°] | tan δ Peak temperature [° C.] | tan δ Peak value | IRCN(I)/IRCN(U) | Permanent deformation due to compression [%] |
|---|---|---|---|---|---|
| Ex. 1 | 71 | −13 | 0.59 | 2.9 | 1.2 |
| Ex. 2 | 73 | −7 | 0.64 | 3.1 | 1.1 |
| Ex. 3 | 75 | −2 | 0.52 | 3.2 | 1.0 |
| Ex. 4 | 74 | −5 | 0.68 | 3.2 | 1.3 |
| Ex. 5 | 77 | −1 | 0.67 | 2.9 | 1.3 |
| Ex. 6 | 73 | −4 | 0.62 | 2.8 | 1.3 |
| Ex. 7 | 75 | −3 | 0.68 | 2.4 | 1.3 |
| Ex. 8 | 74 | −7 | 0.67 | 2.6 | 1.3 |
| Ex. 9 | 72 | −10 | 0.78 | 2.3 | 1.5 |
| C.E. 1 | 64 | −15 | 0.63 | 2.1 | 5.0 |
| C.E. 2 | 81 | 8 | 0.50 | 3.4 | 1.8 |
| C.E. 3 | 71 | −11 | 0.81 | 1.8 | 2.0 |

Ex.: Example,
C.E.: Comparative Example

In each of the cleaning blades of Examples 1 to 9 in which the combination of the first aliphatic polyester polyols and the types and amounts of the second aliphatic polyester polyols used were changed, the peak temperature of tan δ was 5° C. or lower (0° C. or lower). The peak value of tan δ at the peak temperature was 0.7 or less. As a result, tan δ at 40° C. was 0.1 or more and tan δ changed in a gentle curve from a low temperature to a high temperature. The hardness of the urethane rubber (cleaning blade made of urethane rubber) was in the range of 65° to 85° (71° to 77°). The permanent deformation due to compression was 5% or less (1.5% or less).

In contrast, in Comparative Example 1, the hardness of the urethane rubber (cleaning blade made of urethane rubber) was less than 65° and the permanent deformation due to compression was more than 5% because the ratio $M_{OH}/M_{NCO}$ in the step of obtaining a mixture was more than 0.20. In Comparative Example 2, the peak temperature of tan δ of the urethane rubber (cleaning blade made of urethane rubber) was higher than 5° C. because the ratio $M_{OH}/M_{NCO}$ in the step of obtaining a mixture was less than 0.05. In Comparative Example 3, tan δ at 5° C. was more than 0.7.

Accordingly, there was provided a method for producing a cleaning blade made of urethane rubber which could be produced at low temperature and in which the content of an isocyanurate bond in the urethane rubber could be increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-096021 filed Apr. 30, 2013 and No. 2014-082053 filed Apr. 11, 2014 which are hereby incorporated by reference herein in their entirety.

What is claimed is:

1. A method for producing a cleaning blade made of urethane rubber, the method comprising producing the urethane rubber through the steps of:
    obtaining a mixture of a first composition and a second composition by mixing the first composition and the second composition so that a relationship between a number of moles ($M_{NCO}$ [mol]) of an NCO group in the first composition and a number of moles ($M_{OH}$ [mol]) of an OH group in the second composition satisfies formula (a) below, $$0.05 \leq M_{OH}/M_{NCO} \leq 0.20 \qquad (a)$$

where the first composition is obtained by causing a reaction of diphenylmethane diisocyanate and a first aliphatic polyester polyol which has a number-average molecular weight of 2000 to 3500 and is used in an amount of 20 to 40 mol % relative to the diphenylmethane diisocyanate, and the second composition contains a urethane rubber-synthesizing catalyst and a second aliphatic polyester polyol which has a number-average molecular weight of 2000 to 3500 and is the same as or different from the first aliphatic polyester polyol; and obtaining a urethane rubber having an isocyanurate bond by heating the mixture.

2. The method for producing a cleaning blade according to claim 1, wherein the first composition is obtained by causing a reaction of diphenylmethane diisocyanate and a first aliphatic polyester polyol which has a number-average molecular weight of 2000 to 3500 and is used in an amount of 20 to 35 mol % relative to the diphenylmethane diisocyanate.

3. The method for producing a cleaning blade according to claim 1, wherein the first aliphatic polyester polyol is an aliphatic polyester polyol represented by formula (1) below,

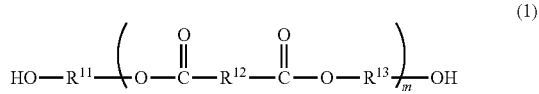

wherein $R^{11}$ to $R^{13}$ each independently represent an alkylene group having 2 to 8 carbon atoms; m represents a number of repetitions of a structure in parentheses; and when m is 2 or more, $R^{12}$ in the parentheses may be the same or different and $R^{13}$ in the parentheses may be the same or different.

4. The method for producing a cleaning blade according to claim 1, wherein the second aliphatic polyester polyol is an aliphatic polyester polyol represented by formula (2) below,

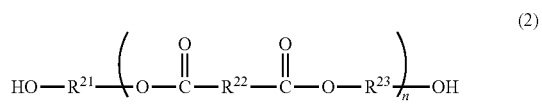

wherein $R^{21}$ to $R^{23}$ each independently represent an alkylene group having 2 to 8 carbon atoms; n represents a number of repetitions of a structure in parentheses; and when n is 2 or more, $R^{22}$ in the parentheses may be the same or different and $R^{23}$ in the parentheses may be the same or different.

5. The method for producing a cleaning blade according to claim 1, wherein a content of the urethane rubber-synthesizing catalyst in the second composition is 0.01% to 0.5% by mass relative to the total mass of the second composition.

6. The method for producing a cleaning blade according to claim 1, wherein the urethane rubber-synthesizing catalyst contains trimethylaminoethylethanolamine.

7. The method for producing a cleaning blade according to claim 1, wherein the first composition and the second composition are mixed so that the relationship between the number of moles ($M_{NCO}$ [mol]) of an NCO group in the first composition and the number of moles ($M_{OH}$ [mol]) of an OH group in the second composition satisfies formula (b) below $$0.08 \leq M_{OH}/M_{NCO} \leq 0.15 \qquad (b)$$

8. The method for producing a cleaning blade according to claim 1, wherein the first aliphatic polyester polyol has a number-average molecular weight of 2000 to 3000.

9. The method for producing a cleaning blade according to claim 1, wherein the second aliphatic polyester polyol has a number-average molecular weight of 2000 to 3000.

10. The method for producing a cleaning blade according to claim 1, wherein the step of obtaining a urethane rubber having an isocyanurate bond is a step of obtaining a urethane rubber having an isocyanurate bond by pouring the mixture into a mold and heating the mixture in the mold.

* * * * *